United States Patent [19]

Nakagome et al.

[11] 3,992,572
[45] Nov. 16, 1976

[54] SYSTEM FOR CODING TWO-DIMENSIONAL INFORMATION

[75] Inventors: Yukio Nakagome, Yokohama; Hiroichi Teramura, Tokyo; Yasuo Fukata, Mitaka; Yasuhiro Yamasaki, Machida, all of Japan

[73] Assignee: Kokusai Denshin Denwa Kabushiki Kaisha, Japan

[22] Filed: Sept. 3, 1974

[21] Appl. No.: 502,358

[30] Foreign Application Priority Data

Aug. 31, 1973  Japan.................................. 48-97221
May 22, 1974  Japan................................. 49-57669

[52] U.S. Cl................................. 178/6; 178/DIG. 3
[51] Int. Cl.²........................................... H04N 1/32
[58] Field of Search............................ 178/DIG. 3, 6

[56] References Cited
UNITED STATES PATENTS

| 3,521,241 | 7/1970 | Rumble | 178/DIG. 3 |
| 3,730,988 | 5/1973 | Shimizu | 178/DIG. 3 |
| 3,743,765 | 7/1973 | Maier | 178/DIG. 3 |
| 3,769,451 | 10/1973 | Connor | 178/DIG. 3 |
| 3,783,187 | 1/1974 | Kusama | 178/DIG. 3 |
| 3,801,737 | 4/1974 | Komura | 178/DIG. 3 |
| 3,830,965 | 8/1974 | Beaudette | 178/DIG. 3 |

Primary Examiner—Robert L. Griffin
Assistant Examiner—Michael A. Masinick
Attorney, Agent, or Firm—Robert E. Burns; Emmanuel J. Lobato; Bruce L. Adams

[57] ABSTRACT

A system for coding two-dimensional information of M lines and N columns, in which two-dimensional information of M lines and U columns is predetermined as a basic block. If any column information in the basic block has an information change with respect to column information immediately preceding it, information in the basic block is coded. If each column information in the basic block has no information change with respect to the column information immediately preceding it, information corresponding to the number of columns of the basic block and the number of subsequent columns having no information change is coded. Two-dimensional information obtained after the computation operation of a correlation function between an instant bit of information and an immediately preceding bit of information in at least either of the line direction and the column direction may be applied as the input of this system. If the entire information of one line does not include any information change with respect to the information immediately preceding it, the number of lines preceding a line including an information change may be coded before the above mentioned coding.

3 Claims, 32 Drawing Figures

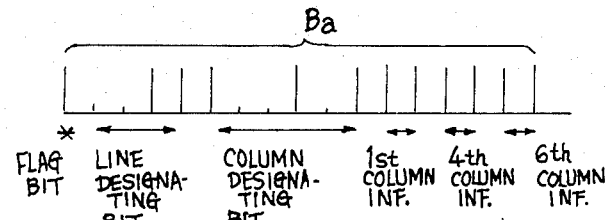
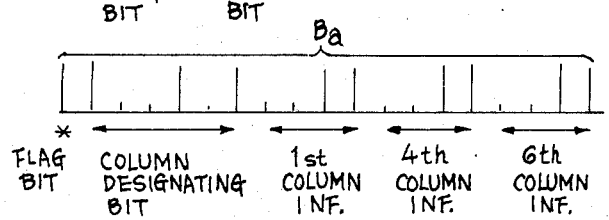
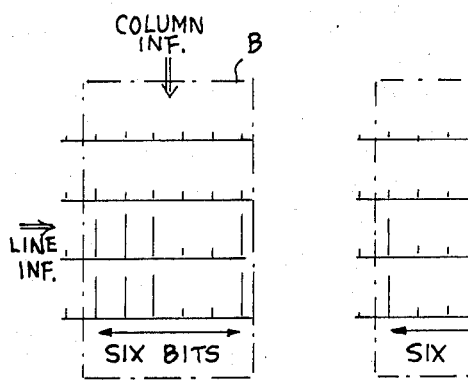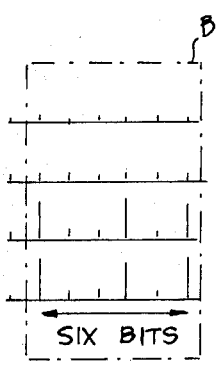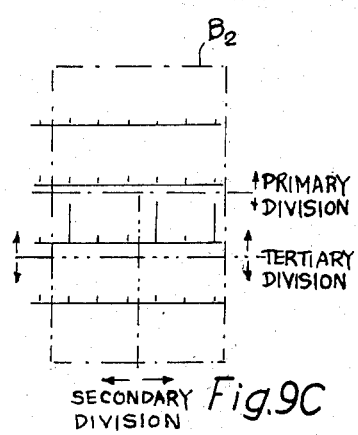
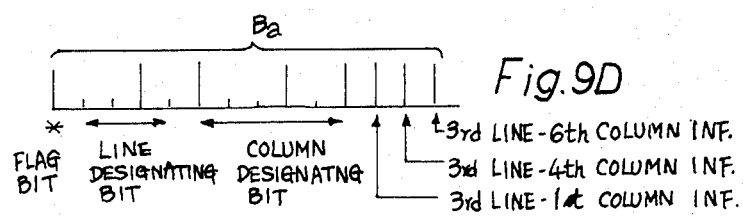
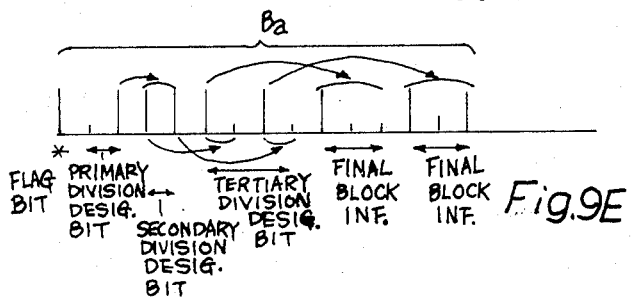

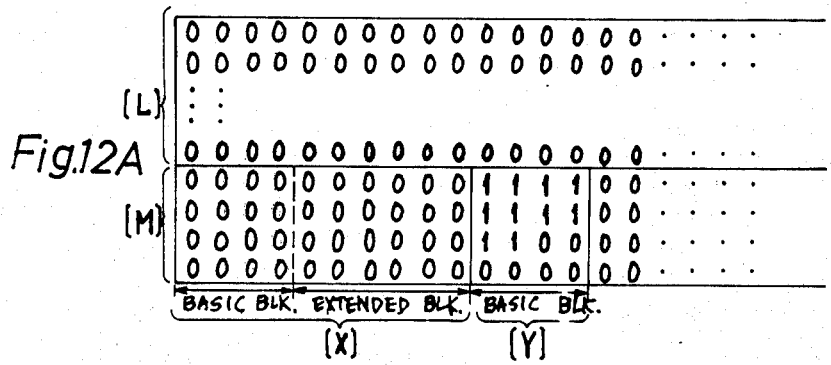
Fig.12A
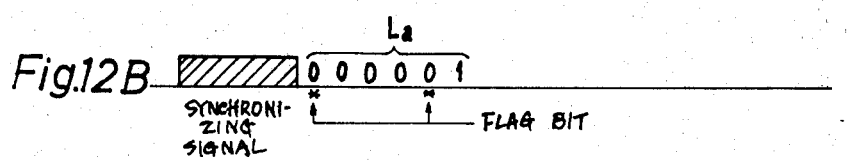
Fig.12B
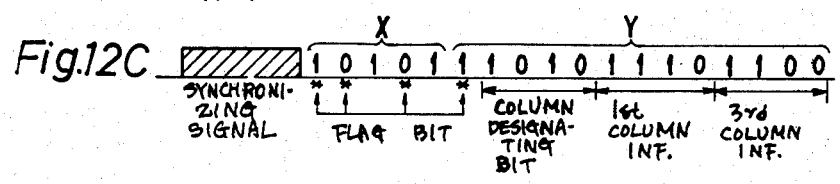
Fig.12C
Fig.12D
Fig.12E

SYSTEM FOR CODING TWO-DIMENSIONAL INFORMATION

This invention relates to a system for coding two dimensional information which is employed for efficient transmission of two dimensional information such as used in facsimile.

In facsimile, an orginal picture is resolved by scanning, converted into an electric signal and then transmitted from the transmitting side and, on the recieving side, scanning of the received picture is achieved in synchronism with transmission to obtain a picture similar to the original one. The main scanning is an operation of directly resolving the original picture and the sub-scanning is an operation of shifting the main scanning in a vertical direction little by little. The minimum unit of the picture thus resolved is called a picture element.

The fundamental process of facsimile comprises the steps of: scanning for transmission for resolving an original picture by scanning into picture elements, photoelectric converting for converting the reflected light from a scanning point into an electric signal, modulating for converting the photoelectrically converted facsimile signal into a signal configuraton suitable for a transmission line, transmitting of the facsimile signal through a transmission line, demodulating for reproducing the original facsimile signal from the received modulated facsimile signal, signal-converting for converting the demodulated facsimile signal into a signal suitable for recording, scanning for reception for scanning the record on the receiving side in synchronism with the transmitting side, and synchronizing of scanning on the transmitting side with that on the receiving side. In the above process, efficient transmission of the facsimile signal is important for efficient utilization of the transmission line.

Heretofore, there have been employed, as a two-dimensional information transmitting system such as facsimile, (1) a system in which signals of respective lines obtained by scanning are transmitted after converting into a time sequence signal and (2) a system in which the signals of every other line are transmitted and, on the receiving side, the signals of those lines which are not transmitted are each predicted from the signals of the transmitted lines immediately prior to and subsequent to them. The system (1) is basically a system of handling a one-dimensional signal so that band width compression is also restricted to the limit imposed on one-dimensional information. In the system (2), the band width compression is ½ of that of the system (1) at most and prediction is required, so the quality deterioration is caused to some degree.

An object of this invention is to provide a system for coding two-dimensional information in which transmitting of two-dimensional information after modulating is processed in one block in a two-dimensional manner, thereby to enable compression of a required transmission band width with respect to the band width-time integral.

In accordance with this invention, there is proposed a system for coding two-dimensional information information of M lines and N columns, in which two-dimensional information of M lines and U columns having a predetermined number of columns U equal or less than the number N is determined as a basic block. If any column information in the basic block has an information change with respect to column information immediately preceding it, information in the basic block is coded. If each column information in the basic block has no information change with respect to the column information immediately preceding it, information corresponding to the number of columns of the basic block and the number of subsequent columns having no information change is coded. An output produced by computation operation of a correlation function with respect to at least one direction of the lines and columns for the overall information of M lines and N columns or for the information of a block having an information change may be applied as the two-dimensional information. If the entire information of one line does not include any information change with respect to the information immediately preceding it, the number of lines preceding a line including an informaton change may be coded before the above mentioned coding.

The principle, construction and operation of this invention will be clearly understood from the following detailed description taken in conjunction with the accompanying drawings, in which:

FIGS. 8A, 8B, 8C, 8D, 9A, 9B, 9C, 9D and 9E are time charts illustrating examples of conversion of two-dimensional information after performing the correlation operation thereof according to this invention;

FIG. 12A is a diagram illustrating an example of a facsimile signal;

FIGS. 12B and 12C are examples of the converted signal of the facsimile signal shown in FIG. 12A;

FIGS. 12D and 12E are diagrams showing division code units for use in this invention;

Figure 1A:
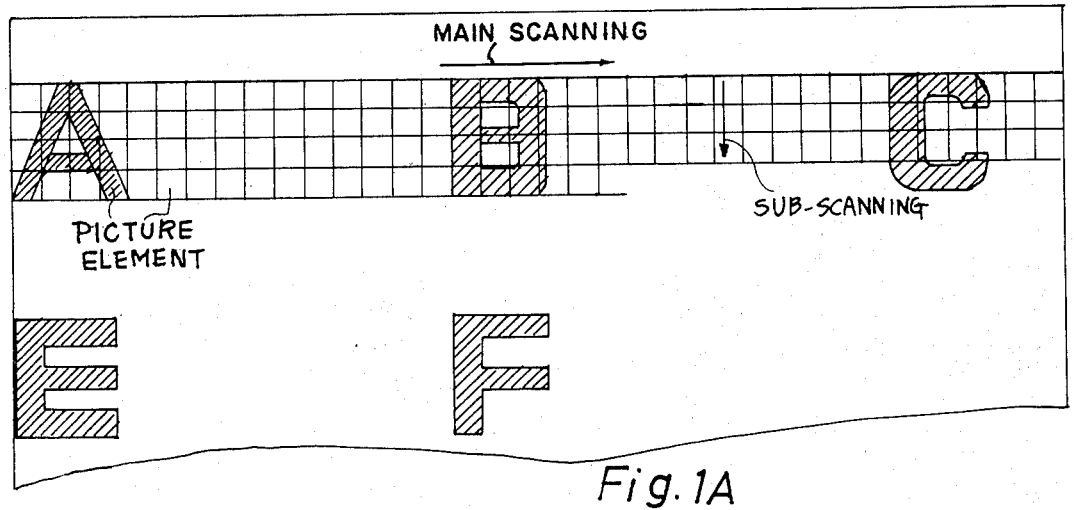
FIGS. 1A and 1B are diagrams explanatory of an example of two-dimensional information for which this invention is applied.
Figure 1B:
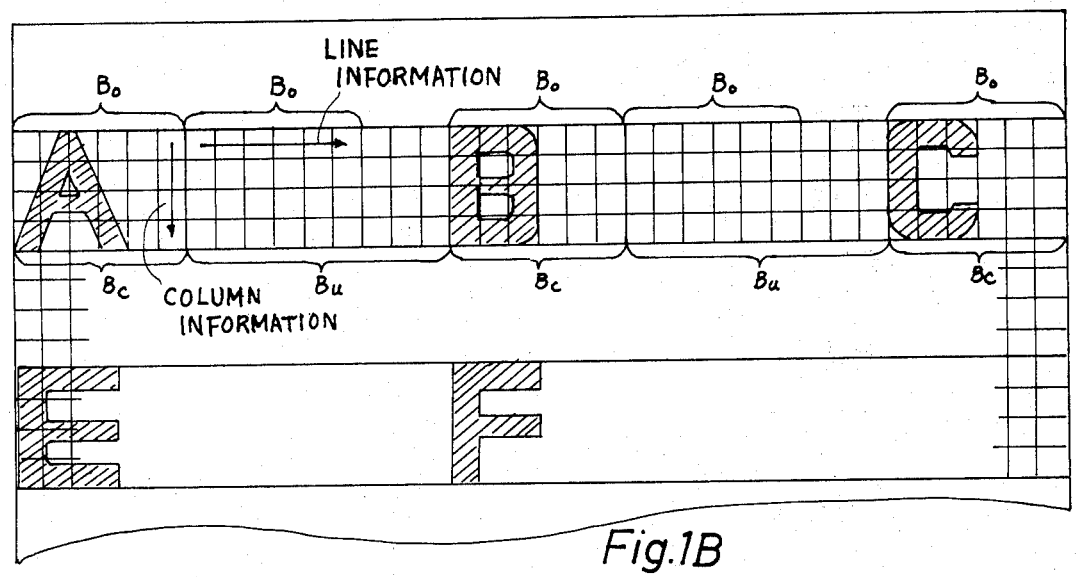

The outline of this invention is as follows. The two-dimensional information such as used in facsimile, shown in FIG. 1A is divided into individual basic blocks Bo of predetermined area as depicted in FIG. 1B, and it is examined whether or not each block includes an information change (in FIG. 1B, an information change from white to black or from black to white). If an information change is detected in the basic block, the block is handled as an information change block Bc in accordance with a predetermined rule, for example, line information (or column information) including the information change in the information change block is transmitted. In a case where no information change is detected in the basic block, the area of the block is extended until an information change occurs next and the extended block is handled as an information unchanged block Bu and its area is transmitted in a coded configuration. With such coding, the transmission band width can be efficiently compressed regardless of the two-dimensional density of changes in the two-dimensional information.

The two-dimensional information is shown in the form of a matrix composed of picture elements of M lines and N columns, so that the states of the picture elements of each line and that of each column are defined as line information and column information, respectively. A predetermined matrix composed of M lines and U columns for examining the presence or absence of the information change will hereinafter be referred to as a basic block. For facilitating a better understanding of the invention, the following description will be given with regard to the case where the information is two-dimentional information in the form of "0" or "1" while the basic block of M lines and U columns is composed of four lines and six columns.

Figure 2A:
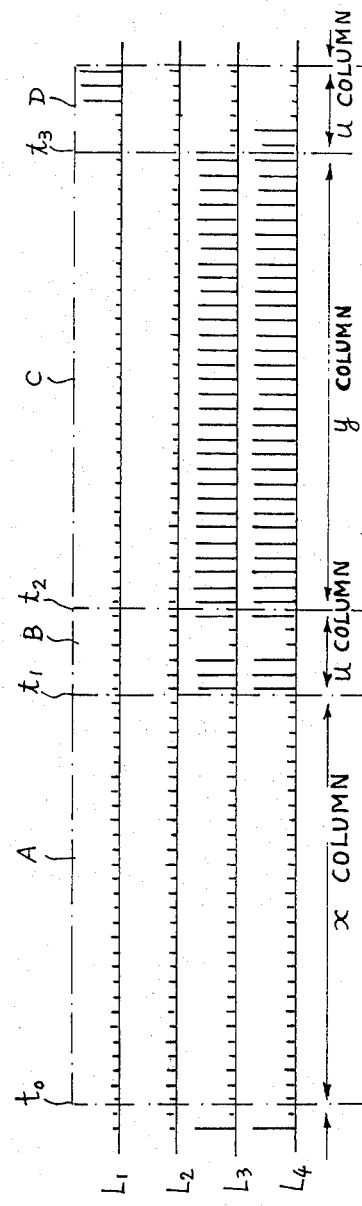
FIGS. 2A and 2B are time charts illustrating an example of conversion of two-dimensional information according to this invention.
Figure 2B:
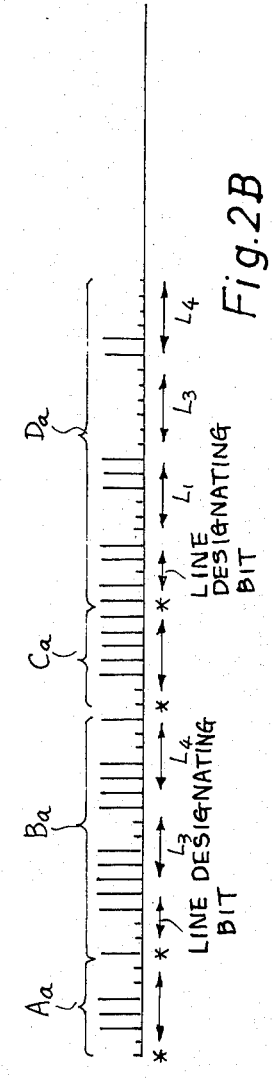

With reference to FIGS. 2A and 2B, an example of coding two-dimensional information according to this invention will be described. FIG. 2A shows a time-charts of two-dimensional information. Reference characters $L_1$, $L_2$, $L_3$ and $L_4$ designate lines and A, B, C and D represent blocks into which the two-dimensional information is divided. FIG. 2B shows a converted pulse train obtained by coding the two-dimensional information. Reference characters Aa, Ba, Ca and Da designate signals obtained by converting the above blocks A, B, C and D, respectively. The steps for obtaining the converted pulse train depicted in FIG. 2B are as follows: At first, each line information of the basic block of four lines and six columns, which starts from boundary $t_o$ (indicated by a one-dot chain line in FIG. 2A) between the block A and a block immediately preceding it, is of the same polarity as each line information bit of the block preceding the block A, so that a block of four lines and $x$ columns ($x > 6$) in which the same information remaining unchanged until an information change occurs in each line is handled as an information unchanged block A. Its converted pulse of the above $x$ is coded into six bits (which is referred to as a code unit length). Moreover, a flag bit (indicated by a mark * in the figure) 0, which indicates that this block is the unchanged information block and that the information Aa is coded, is added to the head of the change signal, as indicated by Aa in FIG. 2B. Next, since the basic block of four lines and six columns, which starts from the boundary $t_1$ at the end of the block A, includes lines L3 and L4 whose information has changed relative to the final bit of each information of the block A, this basic block is handled as an information change block B. Its converted signal is produced in the following manner. Namely, as indicated by Ba in FIG. 2B, a flag 1, which indicates that this block includes the lines having the information change, is attached to the head of the signal Ba. In line designating bits composed of four bits (in the case of the number of lines being four), third and fourth bits corresponding to the lines whose information has changed become 1 while first and second bits corresponding to the lines whose information remains unchanged be-come 0. After the line designating bits, the 6 bit line information of the lines whose information have changed are sequentially transmitted in the order of line number whithout coding (the non-coded 6 bits are referred to as a signal length). Namely, the lines $L_3$ and $L_4$ in Ba of FIG. 2B are the non-coded line information. At this time, since the information of the lines $L_1$ and $L_2$ cannot be transmitted but those of the line designating bits which correspond to the lines $L_1$ and $L_2$ are 0, it is known that the same information as that of the final bits of the corresponding lines of the preceding block A lasts for 6 bits, so that the block B can be demodulated from the received converted signal Ba. Then, since each line after the boundary $t_2$ at the end of the block B still includes the information of the same polarity, $y$ columns which continue until any one of the lines comes to include information change, that is, two-dimensional information of the four lines and the $y$ columns is handled as an information unchanged block C and this block C is coded. Namely, as indicated by Ca in FIG. 2B, a flag bit 0 indicative of the block being coded is combined with the information that $y$ is coded into 6 bits to develope the converted signal of the block C. Next, the line information of the basic block D of four lines and six columns, which starts from the boundary $t_3$ at the end of the block C, includes lines $L_1$, $L_3$ and $L_4$ whose information changes from the final bits of respective line information of the block C. Therefore, the converted signal of this block is such as indicated by Da in FIG. 2B, which has at its head a flag bit 1 indicating that the block includes the lines of information change and in which those of the line designating bits corresponding to the lines $L_1$, $L_3$ and $L_4$ of the information change are 1 and the bit corresponding to the line L2 without any information change is 0. After the line designating bits of 6 bit information of the lines whose polarities have changed in sequentially transmitted in the order of line numbers without being coded. Namely, $L_1$, $L_3$ and $L_4$ of the converted signal Da in FIG. 2B are the non-coded line information. Thereafter, the same converting operations are repeated, by which the two-dimensional information is converted into one-dimensional information and then transmitted after compression of the band width.

Figure 3:
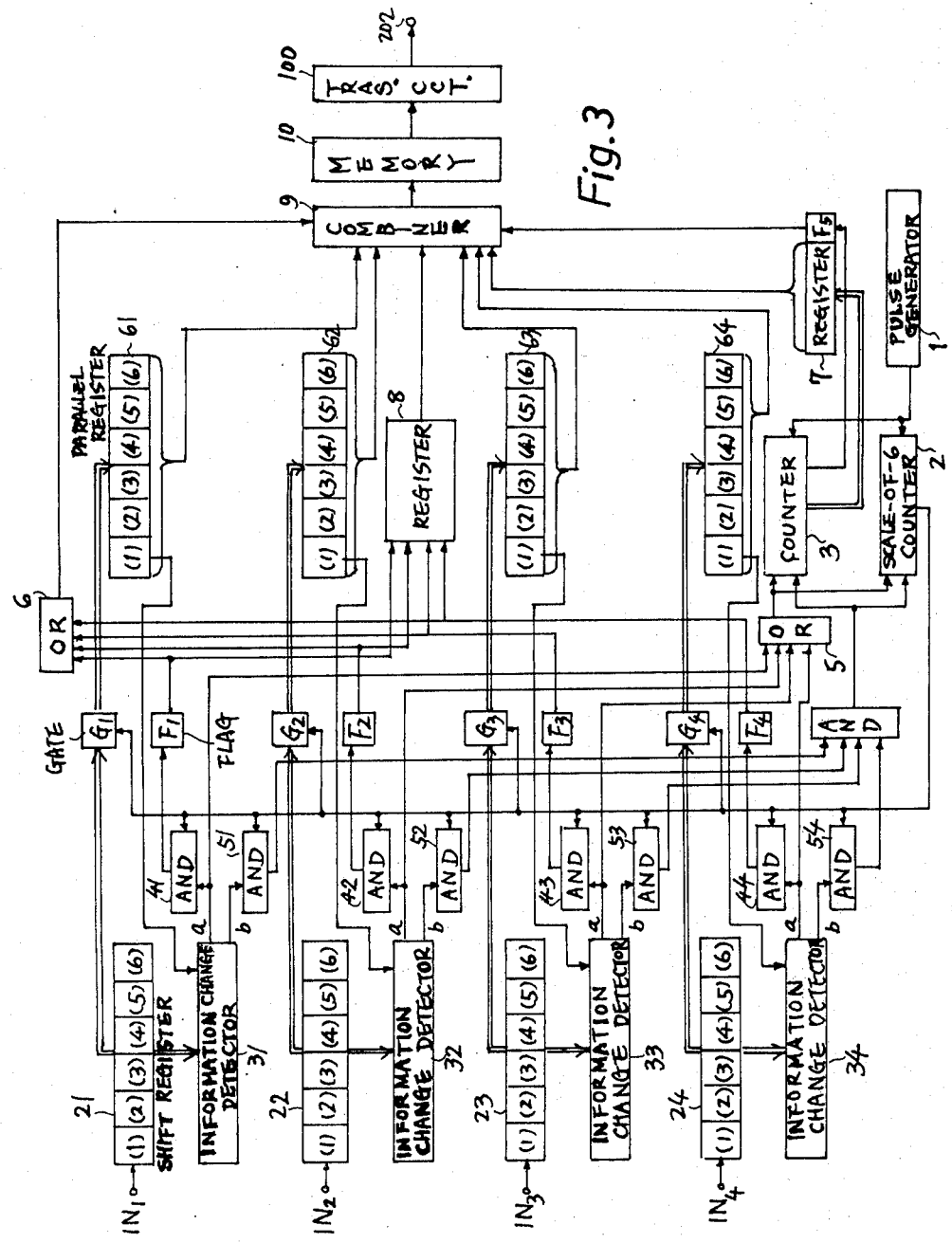
FIG. 3 is a block diagram illustrating an example of this invention.

FIG. 3 shows an example of this invention, which will be described with regard to the case where a predetermined basic block is composed of four lines and six columns as is the case of FIG. 2 so as to facilitate a better understanding of the description. in FIG. 3, those devices indicated by numbers of more than two figures the least significant ones of which are 1, 2, 3 and 4 are necessary for lines $L_1$, $L_2$, $L_3$ and $L_4$, respectively. The other numbers denote devices which are used in common to all the lines. Reference numerals 21 to 24 indicate shift registers; 31 to 34 designate information change detector; 41 to 44 and 51 to 54 identify AND circuits; G1 to G4 represent gates; F1 to F4 denote flags; 61 to 64 show parallel registers; 1 refers to a pulse generator for providing clock pulses synchronized with the scan speed of each line informations; 2 indicates a scale-of-6 counter for counting the number of the clock pulses; 3 designates counter (called as a number-of-column counter) for counting the number of columns in which the same information continues; 4 identifies an AND circuit; 5 and 6 denote OR circuits; F5 represents a flag; 7 shows a register for storing the counted results of the above counter 3; 8 refers to a register (called as a line designating bit register) for storing line designating bits; 9 indicates a combiner for combining the information from the bit register 7, the line designating bit register 8 and the parallel registers 61 to 64 of the respective line with one another; 10 designates a memory for storing the information from the combiner; and 100 identifies a transmitting circuit for transmitting information therefrom.

The operation of the example of FIG. 3 is as follows. Each line information is applied from each of input terminals $IN_1$ to $IN_4$ to each of the shift registers 21 to 24. For the sake of brevity, processing common to the input signals from all of the lines will be described only in connection with the line information $L_1$ applied from the input terminal $IN_1$. The other line information $L_2$, $L_3$ and $L_4$ is processed in exactly the same manner as the line information $L_1$. The information change detector 31 examines the polarities of the information of 6 bits stored in the shift register 21 and that of one bit of a section (1) in the register 61, that is, seven bits in all. In a case where the information of any of the seven bits changes at every one-bit shift of the information in the shift register 21, an information change detecting pulse is derived from the output a of the information change detector circuit 31 and applied to the AND circuit 41 and the OR circuit 5. In a case where no change is detected in the information of the aforementioned seven bits, an information change non-detecting pulse is derived from the output b of the information change detector 31 and applied to the AND circuit 51. In such a case of the blocks A and C shown in FIG. 2A, an output pulse is derived from the scale-of-six counter 2 and, at the instant when this pulse is applied to the AND circuit 51, the information change non-detecting pulse is derived from the output b of the information change detector 31 and, at the same time, a pulse is derived from the AND circuit 51 and applied to the AND circuit 4. The AND circuit 4 is adapted to the supplied with output pulses from the AND circuits 52, 53 and 54 in addition to the AND circuit 51. When an AND output of all the pulses has been obtained in the AND circuit 4, its AND output is applied to the number-of-columns counter 3 and the scale-of-six counter 2. The output pulse from the AND circuit 4 is indicative of starting of the same line information as the immediately preceding one. Upon applicaton of the pulse from the AND circuit 4, the scale-of-six counter 2 stops its counting operation and its contents are reset to 0. The number-of-columns counter 3 is set by the pulse from the AND circuit 4 to count clock pulses applied from the pulse generator 1 until an information change is detected in any line information, that is, until a pulse is applied from the OR circuit 5 as will be described later on. When a pulse is generated in the AND circuit 4, the same information of six columns has already been applied to the shift register 21, so that the counter 3 counts the number of columns which is smaller than that of the same information by six. If the number-of-columns counter 3 is a binary counter, the counted value of the number of columns is in its coded configuration as it is.

Next, when an information change is detected by the information change detector 31 and the information change detecting pulse is derived from its output a, the pulse is applied to the OR circuit 5 so that the pulse having passed through the OR circuit 5 stops the counting operation of the number-of-columns counter 3 while the counter 3 sets its coded counted value in the bit register 7 and, also, sets the flag F5 to the state 1.

Having set its contents in the bit register 7, the counter 3 is reset to the state 0. Further, even if no output pulse is derived from the OR circuit 5, when the counter 3 reaches it full-scale state, the flag F5 is set to the state 1 and the contents of the counter 3 are set in the bit register 7 while the counter 3 continues its counting operation until the next detection of an information change.

On the other hand, when an information change is detected by the information change detector 31 as in the case of the blocks B and D shown in FIG. 2A (no information change exists in the line $L_1$ of the block B but the following description will be made on the assumption that the above line includes an information change by substituting it with the line $L_3$ or $L_4$), an information change detecting pulse is derived from the output a of the information change detecting circuit 31 and applied to the AND circuit 41 and the OR circuit 5 so that the pulse having passed through the Or circuit 5 drives the scale-of-six counter 2. Namely, when the information change detecting pulse indicative of the detection of the information change in any of the line information of the lines $L_1$ to $L_4$ goes out from the OR circuit 5, the scale-of-six counter 2 is driven to start the counting operation of the clock pulses applied from the pulse generator 1 to the counter 2. However, when the pulse is applied to the counter 2 from the OR circuit 5, if the counter 2 is in its counting state, it continues the counting operation. When the counter 2 advances six steps and a pulse indicative of the end of the basic block is derived from the counter 2, this pulse is applied to the gate G1 to transfer the contents of the shift register 21 in parallel configuration to the parallel register 61 and, also, applied to the AND circuits 41 and 51. When an AND output of the pulses from the output a of the information change detector 31 and the scale-of-six counter 2 has been obtained at the AND circuit 41, its output pulse sets the flag F1 to the state 1. Namely, upon detection of an information change at the instant when the output of the counter 2 indicative of the end of the basic block is obtained, the flag F1 is set to the state 1. The content of the flag F1 is applied to the OR circuit 6 together with those of the other flags F2, F3 and F4 so that a pulse is derived from the OR circuit 6. The pulse from the OR circuit 6 indicates that the line information includes a line having an information change. The contents of the flags F1, F2, F3 and F4 are applied to the line designating bit register 8 and stored in the bit positions assigned to the respective lines. The combiner 9 always monitors the OR circuit 6 and the flag F5 and, in the case of the output of the OR circuit 6 being the state 1, writes in the memory 10 a flag bit 1 indicative of the following information being non-coded information, the contents of the line designating bit register 8 and then the contents of the parallel registers of the lines corresponding to the line designating bits set to the state 1 (those lines of the flags F1 to F4 being set to the state 1), that is, line information, in the order of the line number. At the same time, the combiner 9 resets to the state 0 the flags corresponding to the parallel registers whose contents have been written in the memory 10. If the flag F5 is 1, a flag bit 0 indicative of the following information being coded information and the content of the bit register 7 are written in the memory 10 and, also, the register 7 and the flag F5 are reset. If the counter 3 has stages less than six stages, it derives therefrom its counting content in the unit of six bits and, in a case where the counting contents are in excess of the full scale, information of the full scale is sent out with a flag bit 0 at its head. At the same time, the number of excess lines is newly counted and sent out with a flag bit 0 added thereto. In a case where the number of stages of the counter 3 is more than 7 but less than 12, the contents of the first to sixth stages are sent out with a flag bit 0 and the contents of the seventh to twelfth stages are sent out with a flat bit 0. The same is true of more than thirteen stages. Of course, the additional information 0 and 1 in the form of flag bits may also be provided for the blocks B$c$ and B$u$ in the relation opposite to the above. Reference numeral 100 indicates the transmitting circuit, which derives from its output the information of the memory 10 in a non-signal unit. The one-signal unit herein mentioned is, in the case of a flag bit 0, a signal composed of the flag bit 0 and coded information of six bits and, in the case of a flag bit 1, a signal composed of the flag bit 1, a line designating bit and line information.

In the coding of the terminating end portion of the aforesaid two-dimensional information of M lines and N columns, termination is detected by the output of an N-th column detector, for example, a scale-of-N counter (not shown) counting the output pulses from the pulse generator 1. At this time, in the case of an information change block processing, the subsequent column information is assumed to be the same as the N-th column information and the content of the shift register corresponding thereto is applied to the memory 10 through the parallel registers and the combiner 9. In the case of an information unchanged block processing, the counting operation of the number-of-column counter 3 is immediately stopped and its contents are stored in the memory 10 through the bit register 7 and the combiner 9.

The above is a system in which the two-dimensional information is divided into individual basic blocks; an information change in each block is noted; in the case where the same polarity continues more than N columns from the boundary of the blocks, the two-dimensional information of the same polarity is regarded as one block and transmitted after coded; and, in the case where an information change exists, only the line information having the information change is transmitted. Consequently, only significant information is transmitted through the transmission line so that the band width is compressed with respect to the band width-time integral.

Next, a description will be given with regard to reverse conversion of the information converted as described above.

Figure 4:
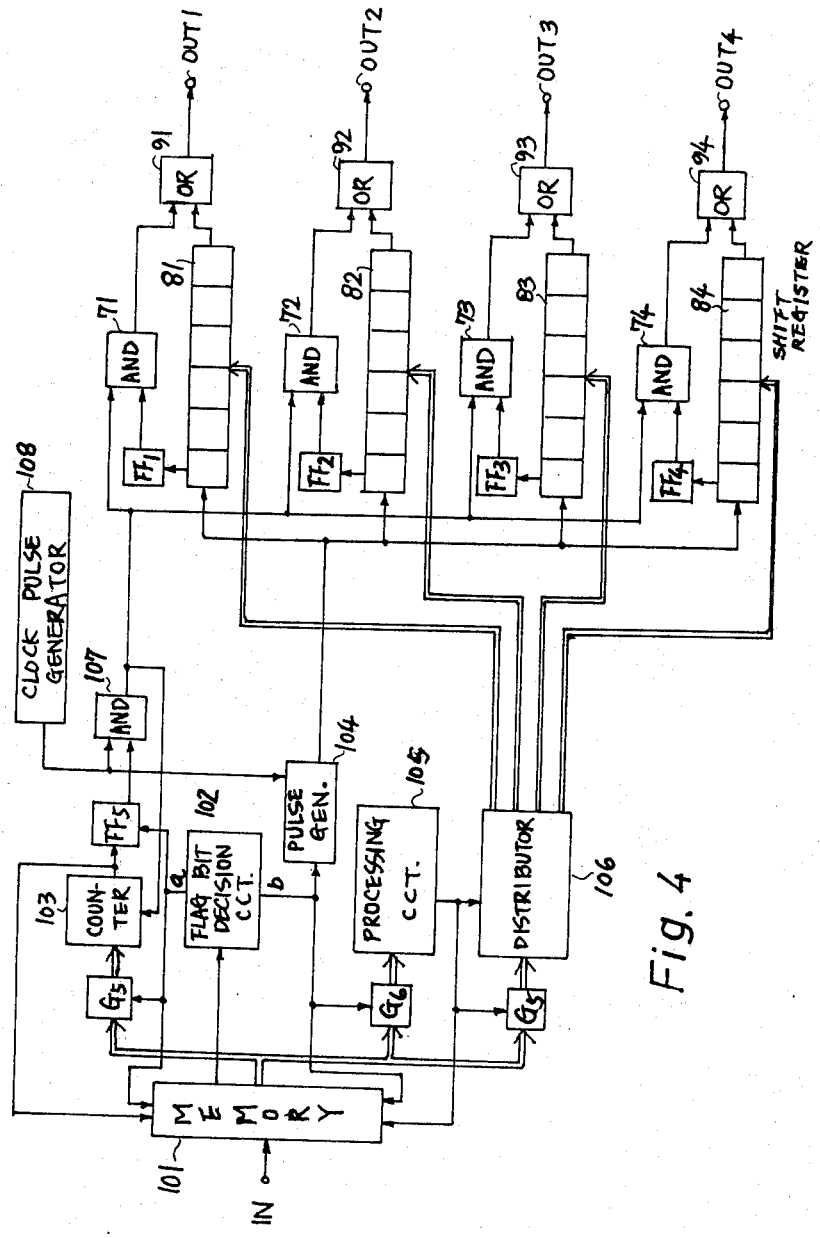
FIG. 4 is a block diagram illustrating an example of a circuit employed for reverse conversion of a converted signal according to this invention.

FIG. 4 is a block diagram showing one example of this reverse conversion, in which reversely converted two-dimensional information is simultaneously derived from output terminals OUT 1 to OUT 4. In FIG. 4, numbers of two figures the units digits of which are 1 to 4 indicate devices corresponding to the first to fourth output terminals OUT 1 to OUT 4, respectively, and other reference numerals designate common devices. Reference character IN represents an input terminal for coded information being transmitted. Reference numeral 101 denotes a memory of received signal; 102 identifies a flag bit decision circuit for deciding whether a transmitted flag bit is 0 or 1; 103 shows a counter (called a column number counter) for temporarily storing the number of columns of a coded signal; 104 refers to a pulse generator which produces six pulses in response to its set condition; 105 indicates a processing circuit for detecting and processing non-coded lines; 106 designates a distributor for distributing non-coded line information to shift registers respectively corresponding to the lines; 107 and 71 to 74 identify AND circuits; 108 represents a clock pulse generator; G5 to G7 denote gates; 81 to 84 show shift registers; 91 to 94 refer to OR circuits; FF1 to FF4 indicate bistable circuits, such as flip-flop circuits; and OUT 1 to OUT4 designate the aforementioned output terminals.

The example of FIG. 4 performs the following operations. The memory 101 stores therein information received through the input terminal IN and provides required information in response to pulses applied from the flag bit decision circuit 102, the column number counter 103 and the processing circuit 105 as described later. At first, a flag bit added to the head of the one-signal unit is applied to the flag bit decision circuit 102 and, then, the signals of the one-signal unit except the flag bit are applied to the gates G5 to G7. In a case where the flag bit is 0 as in the cases of the signals Aa and Ca in FIG. 2B, a pulse is derived from the output $a$ of the flag bit decision circuit 102 and applied to the memory 101, the gate G5 and the flip-flop circuit FF5. Upon opening of the gate 5 with this pulse, the column number counter 103 receives a coded 6-bit (in the case of 4 = 6) signal from the memory 101 and stores a number that six (in the case of 4 = 6) is added to a number signified by the signal. The reason for the addition of 6 is that the counting state of the counter 103 in FIG. 2 is less by 6 bits. The column number counter 103 subtracts the stored number one by one at every application of the output pulse from the subsequent AND circuit 107 and produces an output pulse at the instant of zero, which pulse is applied to the flip-flop circuit FF5 and the memory 101. The flip-flop circuit FF5 is set to the state 1 with the aforesaid pulse from the output $a$ of the flag bit decision circuit 102 and reset with the output pulse of the column number counter 103. The pulse of the column number counter 103 indicates termination of each one-signal unit. When supplied with this pulse, the memory 101 applies a flag bit of the next one-signal unit to the flag bit decision circuit 102. The AND circuit 107 provides an AND output in responce to the pulse applied from the pulse generator 108 and the output of the flip-flop circuit FF5, by which, while the flip-flop circuit FF5 is set to the state 1, the clock pulse of the pulse generator 108 is sent out as the output of the AND circuit 107 and applied to the AND circuits 71 to 74. Accordingly, the output of the AND circuit 107 includes the same number of pulses as the lines of the same information. The AND circuits 71 to 74 are supplied with the output of the AND circuit 107 and the outputs of the flip-flop circuits FF1 to FF4 corresponding to them so that the AND outputs thereof are applied to the OR circuits 91 to 94, respectively. The flip-flop circuits FF1 to FF4 store therein final bits of the shift registers 81 to 84 corresponding thereto and their outputs are applied to the AND circuits 71 to 74, respectively. Accordingly, each circuit provides an AND output in response to the output condition of the flip-flop circuit FF1, FF2, FF3 or FF4 corresponding thereto and the output pulse of the AND circuit 107, whereby pulses of the same polarity as the final bit of each line information of the immediately preceding block and corresponding in number to its column are obtained from each of the AND circuits 71 to 74.

On the other hand, if the flag is 1 as in the signals Ba and Da in FIG. 2B, a pulse is derived from the output $b$ of the flag bit decision circuit 102 and applied to the memory 101, the gate G6 and the 6 bit pulse generator 104. Upon opening of the gate G6 with this pulse, line designating bits are applied from the memory 101 to the processing circuit 105. The 6-bit pulse generator 104 is set with the pulse applied thereto from the output $b$ of the flag bit decision circuit 102 and derives at its output side the six clock pulses from the pulse generator 108, which are applied to the shift registers 81 to 84. These 6-bit pulses serves as shift pulses of the shift registers 81 to 84. The processing circuit 105 processes the line designating bits to detect those lines whose line information is transmitted and those lines whose line information is not transmitted. This circuit 105 counts the number of the lines whose line information is transmitted and, in response to the counted result, provides an output to open the gate G7 and, also, informs the memory 101 of the termination of the one-signal unit. The distributor 106 distributes the line information applied thereto from the memory 101 through the gate G7 to the shift registers 81 to 84 corresponding to the line information, respectively, in accordance with the line discriminating information from the circuit 105. In the example of the signal B a in FIG. 2B, the line information of the line L3 and that of the line L4 are applied to the shift registers 83 and 84, respectively. The final bits of the shift registers 81 to 84 are stored in the flip-flop circuits FF1 to FF4, respectively. The contents of the shift registers 81 to 84 thus set are sequentially shifted by the pulses applied from the 6-bit pulse generator 104 and their outputs are each applied to the OR circuits 91 to 94 corresponding thereto. Since the OR circuits 91 to 94 are supplied with the outputs of the AND circuits 71 to 74 corresponding thereto respectively as described previously, they permit the passage of the outputs applied thereto from the AND circuits or the shift registers corresponding thereto to derive from the output terminals OUT1 to OUT4 the same information as that applied to the input terminals IN1 to IN4 in FIG. 3.

The foregoing description has been given in connection with the information change block transmitting system of the type in which are transmitted a line designating bit designating a line having an information change and line information of the line designated by the line designating bit. Turning now to FIGS. 5, 6 and 7, other examples of conversion will be described in connection with the case of the information change block B in FIG. 2A.

Figure 5A:
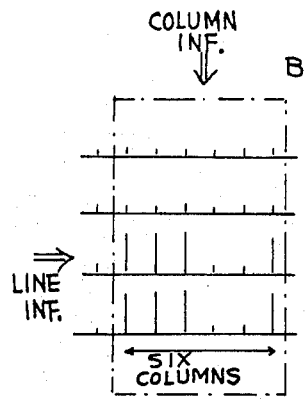
FIGS. 5A, 5B, 5C, 6A, 6B, 7A, 7B and 7C are time charts illustrating other example of conversion of information blocks including information changes.
Figure 5B:
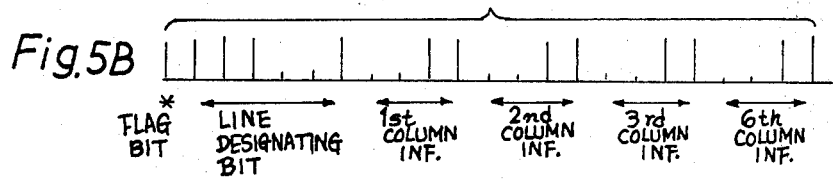
Figure 5C:
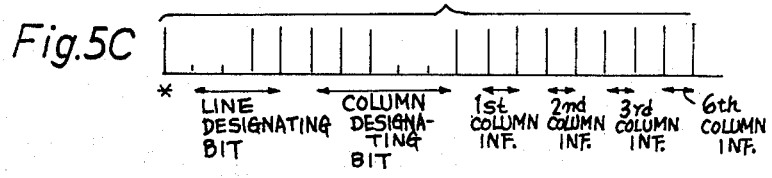

FIGS. 5A, 5B, 5C show the case of designating a column or a line and a column. In FIG. 5A shows the information change block and FIGS. 5B and 5C converted signals of the block B. The converted signal shown in FIG. 5B is composed of a flag bit 1 indicative of the information change block, column designating bits designating columns having information changes and columm information of the designated columns, that is, column information of first, second, third and sixth columns. The converted signal shown in FIG. 5C is composed of a flag bit 1 indicative of the information change block, line designating bits designating lines having information changes, column designating bits designating columns having information changes and information that the designated lines and columns intersect each other, that is, information of the third and fourth lines of the first column, information of the third and fourth lines of the second column, information of the third and fourth lines of the third column and indormation of the third and fourth lines of the sixth column.

Figure 6A:
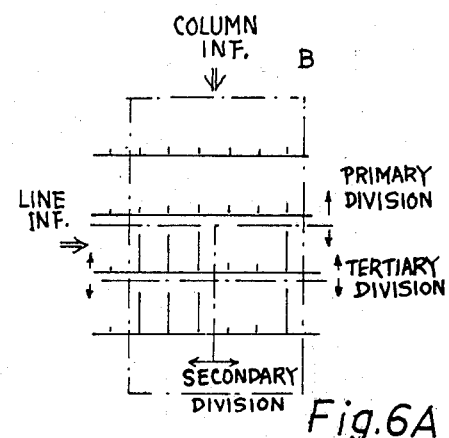
Figure 6B:
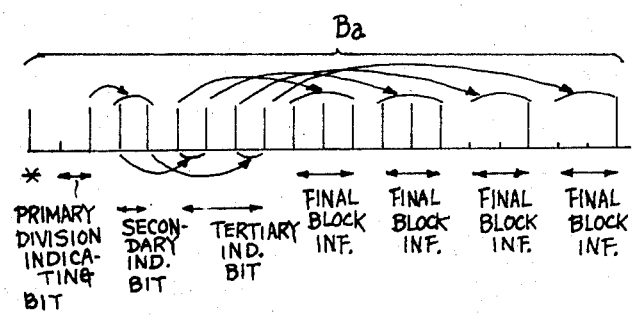

FIGS. 6A and 6B illustrate the case of dividing an information change block. FIG. 6A shows the information change block and FIG. 6B a converted signal of the block B. At first, a flag bit 1 indicative of the block B being an information change block is added to the head of the block. Then, the block B is divided into two blocks (hereinafter referred to as the primary division): one is composed of the first and second lines and the other is composed of the third and fourth lines. If every information is 0 in each block, 0 is assigned to a primary division indicating bit and if 1 exists in each block, 1 is assigned to the primary division indicating bit. The block having the primary division indicating bit 1 (in this example, the block composed of the third and fourth lines) is further divided into two blocks (hereinafter referred to the secondary division): one is composed of the first, second and third columns and the other is composed of the fourth, fifth and sixth columns. If every information is 0 in each block 0 is assigned to a secondary division indicating bit and if 1 exists, 1 is assigned to the secondary division indicating bit. In this example, since the two blocks divided by the secondary division both include 1, the secondary division indicating bit is 11. The block having the secondary division indicating bit 1 is further divided into upper and lower blocks (the third and fourth lines) by a division (hereinafter referred to as the tertiary division). If every information is 0 in the blocks obtained by the tertiary division, 0 is assigned to a tertiary division indicating bit and if 1 exists, 1 is assigned to the tertiary division bit. The information of the block having the tertiary division bit 1 is transmitted as final block information. In this example, the information block is divided first into two and then the secondary and tertiary divisions are achieved. However, a method of dividing the block into many blocks from the beginning may be adopted while the scale of division can also be divided appropriately.

Figure 7A:
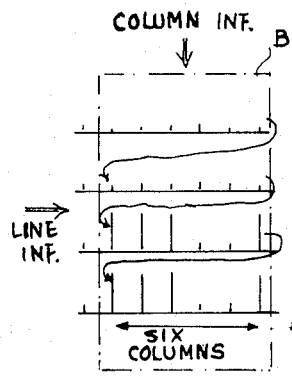
Figure 7B:
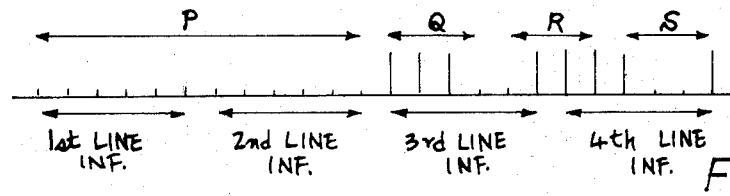
Figure 7C:
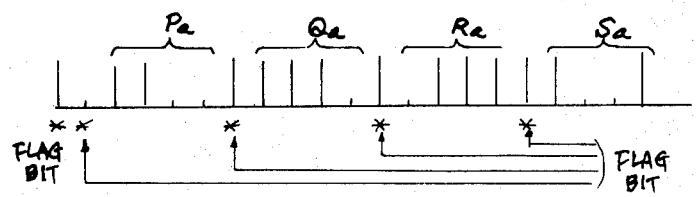

FIGS. 7A, 7B and 7C illustrate the case of converting two-dimensional information after converting it into one-dimensional information. FIG. 7A, shows the information change block B and FIG. 7B an arrangement of respective line information of the two-dimensional block B in one dimension, that is, in such an order as the first line information, the second line information, the third line information and the fourth line information. FIG. 7C shows a signal into which the one-dimensional information shown in FIG. 7B is converted. This converted signal is obtained by the following means. Since first $m$'s bits ($m$ being a predetermined number of bits and, in this case, $m = 4$) of the one-dimensional information shown in FIG. 7B do not include any information change, 12 bits (information P in FIG. 7B) which continue until the next information change occurs are coded (information P'a in FIG. 7C) and added at its head with a flag bit 0 indicative of the information being coded. The next 4-bit information Q includes information changes, so that the information Q is transmitted, as it is, after a flag bit 1 (information Qa in FIG. 7C). Thereafter, the same operations are repeated to obtain the converted signal shown in FIG. 7C. It is also possible to designate lines having information changes with line designating bits, sequentially arrange only the designated lines in one dimension and code them into the converted signal of FIG. 7C.

Further, it is also considered to employ a method in that the aforementioned two-dimensional information is achieved after obtaining the correlation of input information. The line information is compared with the preceding bit information and if a change exists, it is indicated by 1 and if a change does not exist, it is indicated by 0. This operation is defined herein as obtaining correlation in the line direction. The same operation on the column information is defined as obtaining correlation in the column direction. The correlation is obtained over the range covering the overall two-dimensional information of M lines and N columns or only the aforementioned information change blocks. In the former case, the correlation of the information in the information unchange block is 0 and this is the same coding as in the systems described previously. Therefore, the following description will be made regard to the information change block only.

Figure 8A:
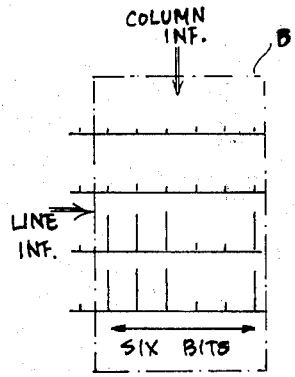
Figure 8B:
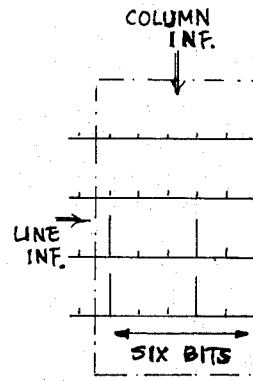

FIG. 8A shows an original information block B; FIG. 8B shows an information block B1 obtained by the correlation in the line direction; and FIGS. 8C and 8D show converted signals Ba of signals shown FIG. 8B. The converted signal shown in FIG. 8C is composed of a flag bit 1 indicative of the block being an information change block, line designating bits designating the lines having information changes (the lines having 1 in FIG. 8B), column designating bits designating the columns having information changes (the columns having 1 in FIG. 8B) and the column and line information designated by the line and column designating bits and arranged in the order of the column number, beginning with the smallest, that is, the information of the third line — the first column and of the fourth line — the first column, the information of the third line — the fourth column and of the fourth line — the fourth column and the information of the third line — the sixth column and of the fourth line — the sixth column arranged in this order. The converted signal shown in FIG. 8D does not include line designation but designates the columns having information changes with column designating bits and is composed of the designated column information in the order of the column number, starting with the smallest, that is, in the order of the first column information, the fourth column information and the sixth column information.

FIG. 9A shows an information change block B (the same as that of FIG. 8A); FIG. 9B shows an information block B1 obtained by the correlation in the line direction (the same as that of FIG. 8B); FIG. 9C shows an information block B2 obtained by further correlation of the block shown in FIG. 9B in the column direction; and FIGS. 9D and 9E show converted signals of the block shown in FIG. 9C, respectively. The converted signal shown in FIG. 9B is composed of a flag bit 1 indicative of the block being an information change block, line and column designating bits designating those lines and columns of the information block B2 having 1 and information that the designated lines and columns cross each other, arranged in order of the column number, beginning with the smallest, that is, in the order of the information of the third line and the first column, the information of the third line and the fourth column and the information of the third line and the sixth column. The procedure for obtaining the converted signal shown in FIG. 9E is as follows. At first, a flag bit 1 indicative of the block being an information change block is at the head. Then, the information block B2 of FIG. 9C is divided into two blocks (hereinafter referred to as the primary division): one is composed of the first and second lines and the other is composed of the third and fourth lines, and if every information is 0 in each block, 0 is assigned to a primary division indicating bit and if 1 is included, 1 is assigned to the primary division indicating bit. The block having the primary division indicating bit 1 (in this example, the block composed of the third and fourth lines) is subdivided into two blocks (hereinafter referred to as the secondary division): one is composed of the first, second and third lines and the other is composed of the fourth, fifth and sixth lines. If every information is 0 in each block, 0 is assigned to a secondary division indicating bit and if information 1 exists, 1 is assigned to the secondary division indicating bit. In the present example, since the two blocks obtained by the secondary division both include 1, the secondary division indicating bits are 11. The block having the secondary division indicating bit 1 is further subdivided into two upper and lower blocks (the third and fourth lines) (hereinafter referred to as the tertiary division). If every information is 0 in each of the blocks obtained by the tertiary division, 0 is assigned to a tertiary division indicating bit and if 0 exists, 1 is assigned to the tertiary division designating bit. The information of the block having the tertiary division indicating bit is transmitted as final block information. In this example, final blocks are the block composed of the first, second and third columns of the third line and the block of the fourth, fifth and sixth columns of the third lines and their information is 100 and 101 respectively. In the present example, an information change block is divided into two blocks, which are further subjected to the secondary and tertiary division but the scale of division can be determined appropriately.

Figure 10:
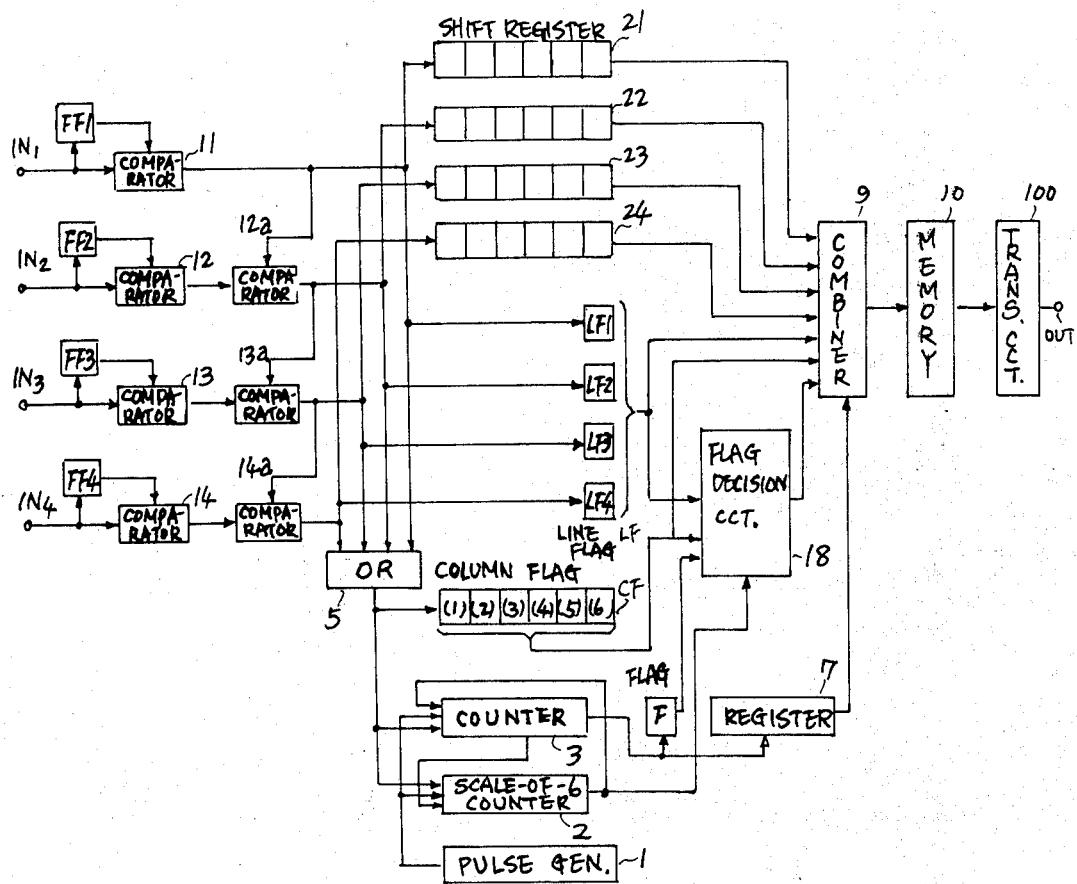
FIG. 10 is a block diagram illustrating an example of this invention for performing the principle described with reference to FIGS. 8A to 9E.

FIG. 10 illustrates one example of a circuit for the practice of the example of conversion shown in FIG. 9A. Comparators 11 to 14 are provided for obtaining the correlation in the line direction, which are exclusive OR circuits for comparing input information of each line with the information of each of the immediately preceding bits stored in flip-flop circuits FF1 to FF4 to provide 0 or 1 depending upon whether or not the input information is the same as the information of the preceding bit. Likewise, comparators 12a to 14a are also exclusive OR circuits, which are comparators for obtaining the correlation in the column direction. The information (the outputs of the comparators 11 to 14 and the outputs of the comparators 11 and 12a to 13a are such as shown in FIGS. 9B and 9C respectively) thus obtained with the respective comparators (11 to 14 and 12a to 13a) is applied from the comparators 11 and 12a to 14a to shift registers 21 to 24 and an OR circuit 5 respectively and, also, to line flags LF1 to LF4, thereby to shift the shift registers 21 to 24 by one bit. The comparator output passing through the OR circuit 5 is applied to a column flag CF, a scale-of-six counter 2 and a column number counter 3. The column flags LF1 to LF4 each indicate the presence of an information change in the line information (6 bits) of the basic block. In a case where the comparator output includes 1, the line flag supplied with the output is set to the state 1. The column flag CF is a shift register, which is shifted by one bit at every application of the output of the OR circuit 5. The line flag LF and the column flag CF are both reset to the state 0 by the output pulse of the scale-of-six counter 2 described later. The column number counter 3 is set by the output of the scale-of-six counter 2 to start counting clock pulses of a clock pulse generator 1 and the counting operation is stopped by an output 1 of the OR circuit 5. If the counted value at this time is more than six (which implies a continuation of more than six columns of the same information, that is, an information unchanged block), the column number counter 3 transfers its content to a register 7 and sets a flag F to the state 1 and, also, resets itself to the state 0. If the counted value is less than six the column number counter 3 does not transfer its information but resets itself to the state 0. The scale-of-six counter 2 is set by the output pulse 1 (indicative of a column having an information change) of the OR circuit 5 to start the counting operation of the clock pulses applied thereto from the pulse generator 1 and produces an output pulse each time when its counted value reaches six. However, if the scale-of-six counter 2 is in its counting state when the output pulse 1 is derived from the OR circuit 5, it continues counting. The scale-of-six counter 2 stops its counting operation with the pulse applied thereto from the column number counter 3 when the counted value of the column number 3 reaches six (which indicates a succession of more than six columns of the same information, that is, an information unchanged blocks), and it is reset to the state 0. A flag decision circuit 18 monitors the outputs from the flag F and the scale-of-six counter 2. When the flag F is set to the state 1, a flag bit 0 is applied from the flag decision circuit 18 to a combiner 9 and when the output of the scale-of-six counter 2 is applied to the flag decision circuit 18, a flag bit 1 is applied to the combiner 9 from the flag decision circuit 18 and, the flag decision circuit decides line information and column information to be transmitted with reference to the line flag LF and the column flag CL. When supplied with the flag bit 0 from the flag decision circuit 18, the combiner 9 transfers the flag bit 0 and the contents of the register 7 to a memory 10. At this time, the register 7 is reset at 0. When the flag bit 1 is applied to the combiner 9, the flag bit 1 is followed by the contents of the line and column flags LF and CF in the form of line and column designating bits and then the information of the lines and columns decided by the flag deciding circuit 18 is transferred to the memory 10. Reference numeral 100 indicates a digital signal transmitting circuit, which transmits the information of the memory 10 to the output terminal.

Figure 11:
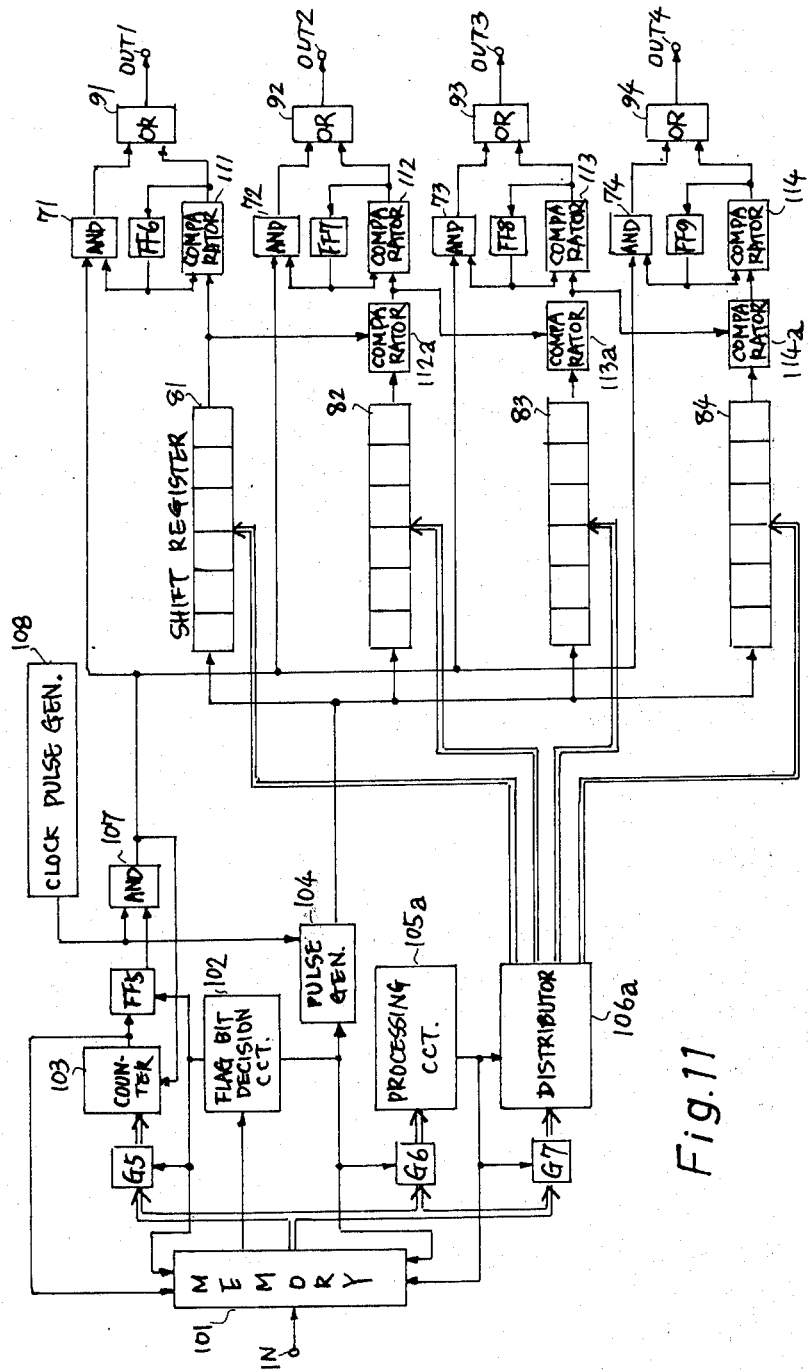
FIG. 11 is a block diagram illustrating an example of a circuit employed for reverse conversion of a converted signal in the example shown in FIG. 10.

FIG. 11 is a block diagram showing one example of reverse conversion of the example of FIG. 10. Its operations are substantially the same as in FIG. 4, and hence will briefly be described. A received signal applied through an input terminal IN is once stored in a memory 101. If its flag bit is 0, information indicative of the number of columns in which the same information continues is transferred to a column number counter 103 to apply therefrom the same number of pulses as the columns to an AND circuit 107. If the flag bit is 1, line and column designating bits are transferred to a processing circuit 105a and thereby discriminated from each other to derive from the circuit 105a a control signal for a distributor 106a. The distributor 106a distributes the line information and the column information to shift registers 81 to 84 under the control of the processing circuit 105a. The contents of the shift registers 81 to 84 are each shifted by one bit by shift pulses from on 6-bit pulse generator 104 and applied to comparators 111 and 112a to 114a, respectively. The comparator 112a is a circuit which performs an operation opposite to that of the comparator 12a depicted in FIG. 10. Namely, if the information derived from the shift register 82 is 0, the comparator 112a provides therethrough the information from the shift register 81 while if the information is 1, the comparator provides therethrough the information from the shift register 81 after reversing its polarity: that is, if the polarity is reversed to 1 or 0 depending upon whether it is 0 or 1. The comparators 113a and 114a perform similar operations. The comparator 111 is a circuit which performs a function reverse to that of the comparator 11 in FIG. 10. Namely, if the information from the shift register 81 is 0, the comparator 111 derives therefrom the information of the immediately preceding bit stored in a flip-flop circuit FF6 and if the information is 1, the information of the flip-flop circuit FF6 is provided after its polarity is reversed to 1 or 0 depending upon whether it is 0 or 1. The comparators 112 to 114 perform also similar operations. The respective flip-flop circuits FF6 to FF9 always stores therein the same information as the immediately preceding bits, and AND outputs of the outputs from the flip-flop circuits and the output pulses from the AND circuits 107 are obtained by AND circuits 71 to 74, respectively, whereby line information of respective lines of an information unchanged block is applied to OR circuits 91 to 94, respectively. By obtaining OR outputs of the outputs of the AND circuits 71 to 74 and the comparators 111 to 114, the OR circuits 91 to 94 supply output terminals OUT 1 to OUT 4 with the same information as that applied to the input terminals IN1 to IN4 in FIG. 10.

The other converted syginals shown in FIGS. 8A to 9E can also be processed by substantially the same circuit construction as above described.

Further, it is a matter of course that the correlation may be obtained first in the line direction or in the column direction.

In the foregoing example, the signal length transmitted without being coded and the code unit length transmitted after coded are described to be of the same number of bits $u = 6$ but they need not always be the same since these lengths can be distinguished from each other by the use of their flag bits. Further, the signal length can also be changed with the intervals of information changing points and the code unit length can also be changed with the length of the same information.

Moreover, the method of examining the presence of an information change by applying column information one by one has been described as a method of making an information unchanged block from a basic block. However, a general method is such that if every line information in a basic block of M lines and $u$ columns has no information change, two-dimensional information of M lines and B1 columns, two-dimensional information of M lines and B2 columns, two-dimensional information of M line and Bi columns (B1, B2, Bi being predetermined numbers of columns respectively following the above basic block) are sequentially applied until an information change occurs in any line information in the next subsequent two-dimensional information of M lines and $Bi + 1$ columns and that this two-dimensional information of M lines and $(u + b1 + B2 + Bi)$columns is handled as an information unchanged block. In the case of B1, B2, $Bi = K1$ (already described in connection with the case of K = 1), the area of the information unchanged block is such that the number of columns of the basic block increases by K's columns but it is also possible that B1, B2, B$i$ have different values.

For convenience of description, binary information 0 or 1 is used as input information in the foregoing, but this invention is also applicable to general digital information or analog information. For example, in the case of a signal that one sampled value is represented in the configuration of several bits such as a television signal, this system can be used regarding each bit as line information. Further, in the case of analog information, several reference levels are predetermined and the information is converted into a binary signal that the positions intersecting the reference levels are regarded as information changing points and the number of the reference levels is used as the number of lines in this system.

As has been described in detail in the foregoing, this invention is a system in which, noting an information change of a two-dimensional block or an information change of two-dimesional information after obtaining correlation, if no information change occurs, the block is extended and its magnitude is coded and if an information change occurs, the line or column information of the block having the information by dividing the block into smaller ones is transmitted. Accordingly, this invention enables compression of the band width relating to the product of band width and time regardless of two-dimensional density of information changes. The two-dimensional information coding system of this invention is of particular utility for information such as a facsimile signal in that white and black portions are formed in rows and in columns, that is, two-dimensional correlation is high. In the above system, its band width compression effect is high in the removal of redundancy of signals of higher correlation between lines and columns such as facsimile signals but compression for scanning lines having no information change (hereinafter referred to as idle lines) is not sufficient.

This invention can be applied to obtain a higher compression effect as compared with the above mentioned former system.

A description will be given first of the gist of the latter system of this invention in connection with a facsimile signal shown in FIG. 12A. In FIG. 12A, white and black correspond to 0 and 1, respectively.

1 If every information of one scanning line does not change from that immediately preceding it as in a first line of the portion indicated by (L) in 12A, the number of idle lines until a scanning line including an information change as in a first line of the portion indicated by (M) occurs, that is, the number of scanning lines included in (L), is coded. In the following description, a scanning line whose information is white is regarded as an idle line ; the number of idle lines until a scanning line including black occurs is rendered into a division code, added with a flag bit 0 indicative of the idle lines and transmitted following a synchronizing signal. To be concrete, idle lines included in (L) in FIG. 12A are coded as shown by La in FIG. 12B using 2-bit division code units shown in FIG. 12E. In the figures, a mark (*) indicates flag bits.

2 In m's scanning lines starting with a scanning line including a black as indicated by (M) in FIG. 12A, information bits of a block composed of predetermined m's lines and u's bits (hereinafter referred to as m's lines and u's columns) (which block will hereinafter be referred to as a basic block which is shown to be composed of four lines and four columns) are noted; if information of each column does not change from that of the column immediately preceding it, the block is extended by adding thereto columns one by one until a column including an information change occurs. This block will hereinafter be referred to as an information unchanged block, and the number of the added columns is coded and transmitted together with a flag bit 0 indicative of the information unchanged block. To be concrete, the number of added columns of the information unchanged block indicated by (X) in FIG. 12A is coded as indicated by (Xa) in FIG. 12C using 1-bit division code units depicted in FIG. 12D. The synchronizing signal is a flag bit which indicates that 1 following it is not an idle line.

3 If information of any of the columns of the basic block composed of m's lines and u's columns is different from that of the column immediately preceding it, this basic block is handled as an information change block. Namely, a flag bit 1 indicative of the information change block is added to the head of the block, the column including the information change is designated with a column designating bit and the information of the designated column is transmitted as it is. In Y of FIG. 12A, second and fourth columns include the same information as first and third columns, respectively, and consequently the second and fourth columns do not change from the first and third columns, respectively, and only the first and third columns include information changes. As a result of this, a flag bit 1 indicative of the information change block is added to the head of the block information while first and third ones of four column designating bits are made 1 to designate the columns including the information change and then information 1110 and 1100 of the designated first and third columns are transmitted one after the other. Other various systems may be adopted for the transmission of information in the information change block as described with reference to the former examples.

Figure 13:
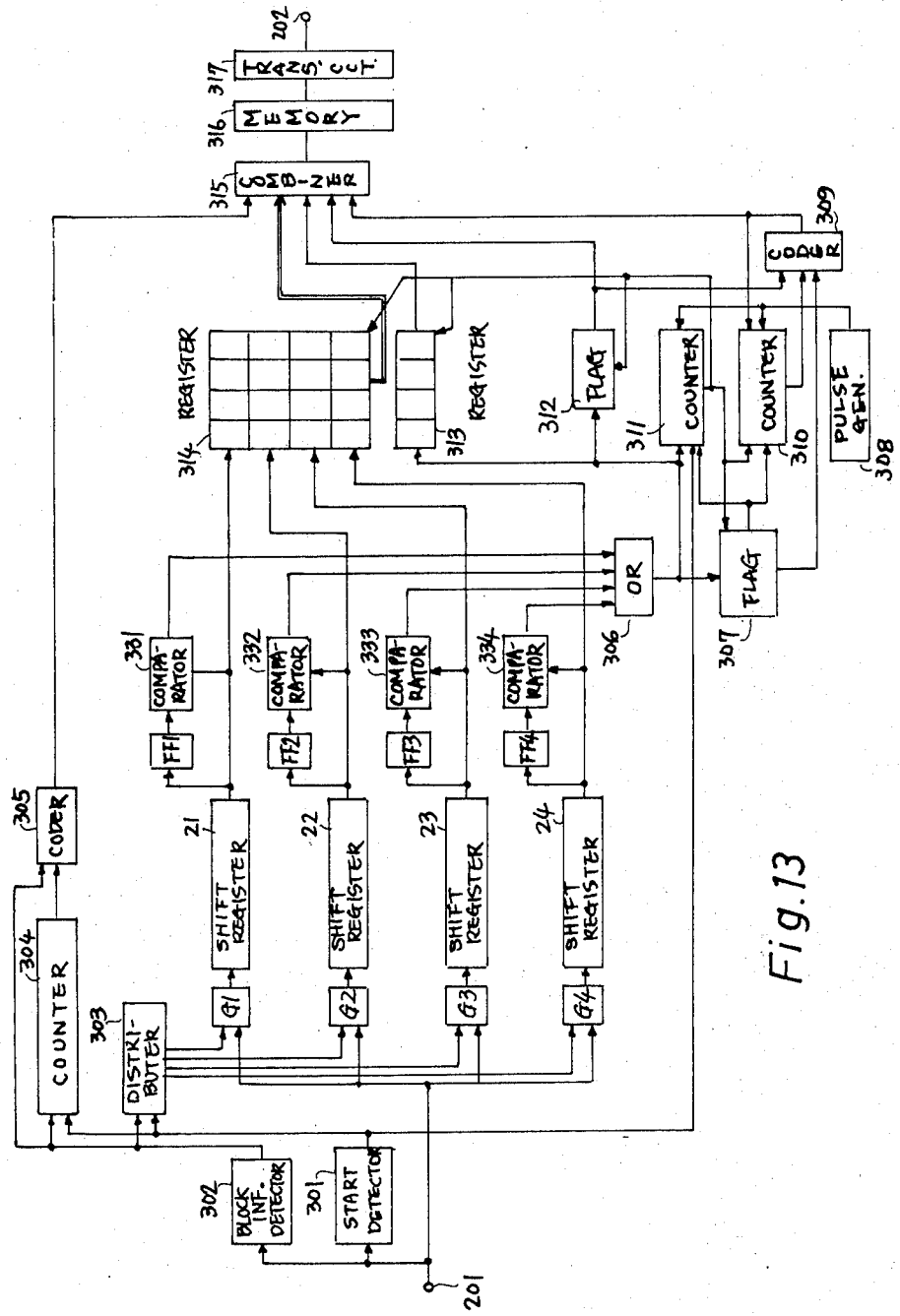
FIG. 13 is a block diagram illustrating another example of this invention.

FIG. 13 is a block diagram showing an embodiment of the transmitting system in the case of practising the latter example of this invention. In order to facilitate a better understanding of the description, the predetermined basic block is assumed to be composed of four lines and four columns as is the case with FIG. 1. Reference numeral 201 indicates an input terminal; 202 designates an output terminal, 301 identifies a start detector for detecting the start of scanning 302 denotes a black information detector; 303 represents a distributor by which signals of four scanning lines starting with a scanning line including black are distributed to shift registers, respectively. Reference numeral 304 shows a counter (called an idle-line-number counter) for counting the number of idle lines 305 refers to a coder for coding the content of the counter 304; 306 designates an OR circuit 307 indicates an information unchanged block flag which becomes 1 when an information unchanged block is produced; 308 identifies a pulse generator for generating a clock pulse; 309 represents a coder for coding the content of a counter 310; 310 denotes a counter (called a column-numbercounter) for counting the number of columns of the information unchanged block; 311 shows a 4-bit counter; 312 refers to an information change block flag which becomes 1 when an information change block is produced; 313 indicates a register (called a column designating bit register); 314 designates a register for storing information of the information change block; 315 represents a combiner for combining the information of the coders 305 and 309 with that of the registers 313 and 314 and the flag 312 and, if necessary, adding thereto a synchronizing signal and a flag bit; 316 identifies a memory for storing the composite signal; 317 denotes an information transmitting circuit for transmitting the information in a configuration suitable for a transmission line; G1 to G4 show gate circuits; 21 to 24 refer to shift registers; FF1 to FF4 indicate flip-flop circuits for storing the same information as preceding bits respectively, and 31 to 34 designate comparators for comparing the polarity with that of the preceding bits respectively.

The embodiment shown in FIG. 13 performs the following operations. Such a facsimile signal as depicted in FIG. 12A is applied to the terminal 201 for each scanning line. The signal applied to the terminal 201 is applied to the start detector 1 and, also, to the black information detector 302 and the gate circuits G1 to G4. Upon detection of the start of scanning, the start detector 301 applies its detecting pulse to the distributor 303, the idle-line-number counter 304 and the 4-bit counter 311. If black information is included in the input signal, the black information detector 302 detects it and applies it to the distributor 303, the counter 304 and the coder 305. The counter 304 counts the number of output pulses from the start detector 301, that is, the number of idle lines, until black information in the input signal of one scanning line is detected by the black information detector 302. Upon detection of the black information by the circuit 302, the counted value of the counter 304 is coded by the 305 and applied to the combiner 315 and, at this time, the counter 304 is reset. The distributor 303 is a circuit which sequentially applies pulses to the gates G1 to G4 for applying signals of four scanning lines starting with a scanning line including black informtion. The gate G1 is held open until the gate G2 is opened by the output of the circuit 301 after the black information is detected by the circuit 302 and the input signal is stored in the register 321. When the black information is detected by the circuit 302 and its output is applied to the distributor 303, the gates G2, G3 and G4 are opened one after another in synchronism with the subsequent output pulses of the start detector 301 and signals of each scanning line are stored in each of the shift registers 322 to 324. At this time, the shift register 321 has already stored therein the signals of one scanning line including the black information through the gate G1 prior to storing of the signals in the registers 322 to 324. When the signals of four scanning lines are stored in the shift registers 321 to 324, signals in these registers are shifted in parallel bit by bit by shift starting pulses (not shown) from the distributor 303 and the outputs of the shift registers are applied to the flip-flop circuits FF1 to FF4 and the comparator 31 to 34, respectively and then compared with bits immediately preceding them. If they are different in polarity from the immediately preceding bits, the comparators 331 to 334 apply their output pulses to the OR circuit 306. The flip-flop circuits FF1 to FF4 are reset to the state 0 immediately before the registers 321 to 324 start to shift. The signals of the shifted registers 321 to 324 are sequentially stored in the information change block register 314. The 4-bit counter 311 is set by the shift starting pulse (not shown) simultaneously with the start of shifting of the registers 321 to 324 and provides an output pulse when having counted four bits. If an output is derived from the OR circuit 306 before the counter 311 produces the output pulse after set, the information change block flag 312 is set to the state 1. If no output is derived from the circuit 306, the information unchanged block flag 307 is set to the state 1. When the flag 307 is set to the state 1, the counter 310 starts to count the clock pulses derived from the pulse generator 308 and continues its counting operation until the flag 307 is reset to the state 0 by the output pulse of the OR circuit 306. When the flag 307 is reset to the state 0, the counted value of the counter 310 at that time is coded by the coder 309 and applied to the combiner 315 and, also, the counter 310 is reset. On the other hand, the flag 312 is set to the state 1 by the output pulse of the OR circuit 306 and the counter 311 starts counting. In a case where the counter 311 is already in its counting, it continues its counting operation. The output of the OR circuit 306 is applied to the column designating bit register 313 and stored therein. If the flag 312 is 1 at an instant when the counter 311 has counted four bits, the contents of the column designating bit register 13 and the information corresponding to the column set to the state 1 in the register 313 are read out from the information change block register 314 with a flag 1 at the head of them and applied to the combiner 315. At this time, the flag 312 is reset to the state 0. The combiner 315 combines the information of the coders 305 and 309 and that of the register 314 and 315 to provide a composite signal and, if necessary, adds a combined signal and a flag bit thereto and writes the signal in the memory 316. The information stored in the circuit 316 is transmitted by the information transmitting circuit 317 after modulated into a signal configuration suitable for the transmission line.

Figure 14:
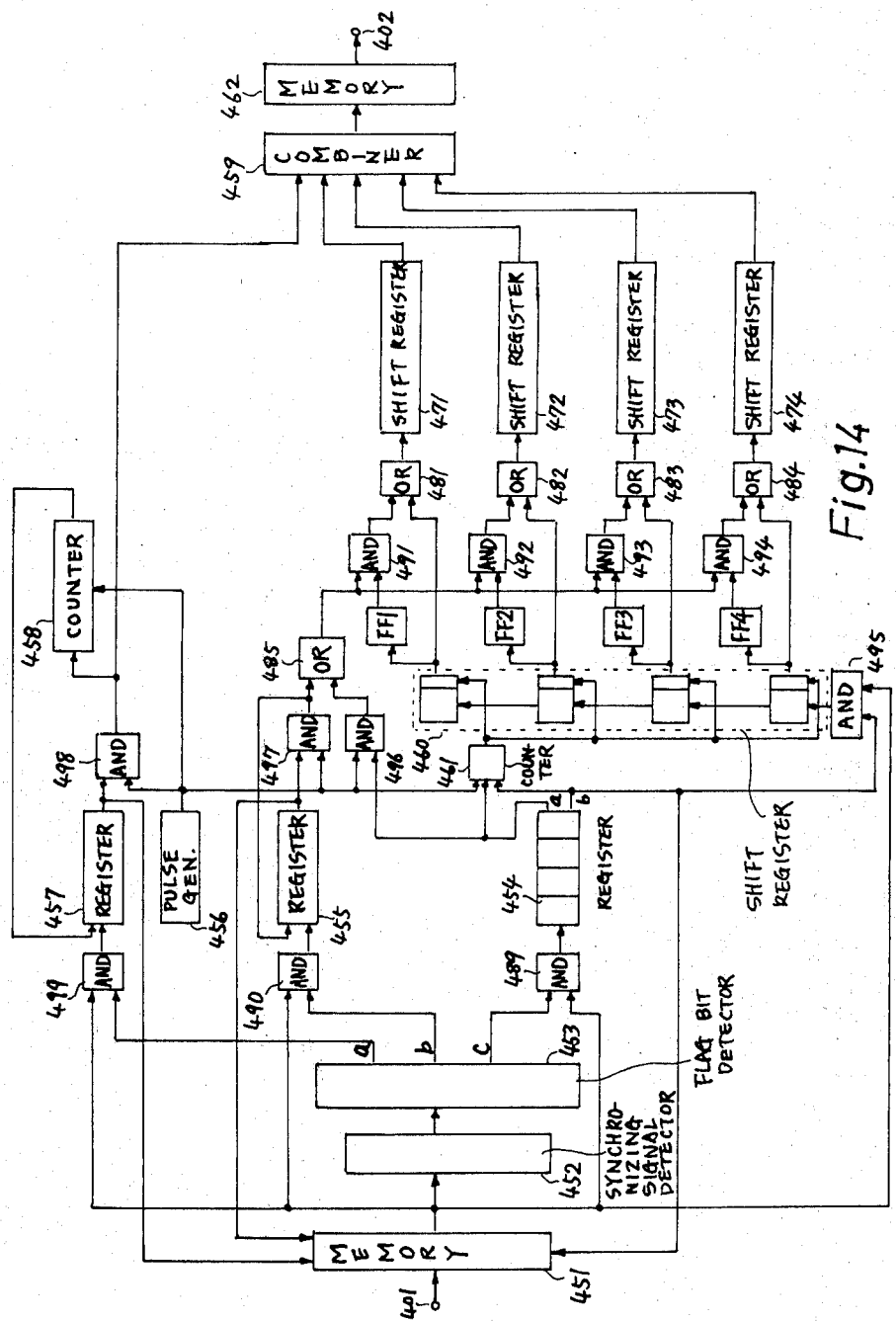
FIG. 14 is a block diagram illustrating an example of a circuit employed for reverse conversion of a converted signal in the example shown in FIG. 13.

Next, a description will be given in connection with reverse conversion of the signal conversion achieved in the manner described above. FIG. 14 is a block diagram illustrating an embodiment of the reverse conversion. Reference numeral 401 indicates an input terminal ; 402 designates an output terminal from which is derived a reversely converted signal ; 451 identifies a memory ; 452 denotes a synchronizing signal detector ; 453 represents a flag bit detector for detecting a flag bit to discriminate whether it is 0 or 1 ; 454 shows a register (called a column designating bit register) ; 455 refers to a register (called a column-number register) for storing the number of columns of an information unchanged block ; 456 indicates a clock pulse generator for generating clock pulses ; 457 designates a register (called an idle-line-number register) ; 458 denotes a pulse counter for counting the number of bits of one scanning line ; 459 identifies a combiner for combining a signal from an AND circuit 498 with signals from shift registers 471 to 474 to reproduce the same signal as that applied to the input terminal 201 in FIG. 13 ; 460 represents a shift register having a serial — parallel conversion function ; 481 to 485 show OR circuits ; 489 to 499 refer to AND circuits ; FF1 to FF4 indicate flip-flop circuits 461 designates a 4-bit counter ; and 462 denotes a storage circuit.

One example of the operation of the circuit of FIG. 3 is as follows. The memory 451 stores therein information received through the input terminal 401 and applies required information to the synchronizing signal detector 452 and the AND circuits 489, 490 and 499 in accordance with information fed from the registers 454, 455 and 457, as will be described later. At first, a synchronizing signal is detected by the synchronizing signal detector 452 from the received signal stored in the memory 451 and in response to the detected synchronizing signal, a flag bit is detected by the flag bit detector 453 from the received signal. If a flag bit immediately subsequent to the synchronizing signal is 0, the detector 453 derives therefrom an output pulse at its terminal $a$ (the case of FIG. 12B). In a case where the flag bit immediately subsequent to the synchronizing signal is 1, the flag bit detector 453 detects the polarity of each of flag bits present between the above flag bit and the next subsequent synchronizing signal and provide an output pulse at its terminal $b$ or $c$ depending up whether the detected flag bit is 0 or 1 (the case of FIG. 12C). When the output pulse is derived at the terminal $a$, information indicative of the number of idle lines is applied from the circuit 451 to the register 457 through the AND circuit 499 until the next synchronizing signal is detected. If the contents of the register 457 are not zero, clock pulses from the pulse generator 456 are applied to the counter 458 and the combiner 459 through the AND circuit 498. Having counted a predetermined number of bits of one scanning line, the counter 458 produces an output pulse, which is applied to the register 457. At every reception of a pulse from the counter 458, the register 457 decreases its contents by one and when its contents are reduced to zero, it provides an output pulse, which is applied to the circuit 451 to read out the next information therefrom. In the meantime, the combiner 59 is supplied with 0 information of scanning lines corresponding to the number of idle lines. When an output pulse is derived at the terminal $b$ of the circuit 453, information indicative of the number of added columns of an information unchanged block is applied from the circuit 451 to the column number register 455 through the AND circuit 490 until the next flag bit 1 or synchronizing signal is detected. The register 455 stores therein the information on the number of the added columns and on the number of columns of the basic block. If the content of the register 55 is not 0, clock pulses from the pulse generator 456 are applied to the OR circuit 485 and the register 455 through the AND circuit 497. By obtaining logical products of the output pulse from the OR circuit 485 and the outputs from the flip-flop circuits FF1 to FF4 by the AND circuits 491 to 494 respectively, bits which are of the same polarity as the informtion of the columns immediately preceding the information unchanged block, are stored in the shift registers 471 to 474 through the OR circuits 481 to 484, respectively. The register 455 reduces its content one by one by pulses fed from the AND circuit 497 and when its content is reduced to zero, the register produces an output pulse, which is applied to the circuit 451 to read out the next information therefrom. In the meantime, the OR circuit 485 derives therefrom pulses corresponding to the number of columns of the information unchanged block. When the circuit 43 provides an output pulse at the terminal $c$, column designating bits are read out from the circuit 451 and applied to the register 454 through the AND circuit 489. The register 454 shifts one by one and produces an output pulse at its terminal $b$ or $a$ depending upon whether the information applied to its input end is 1 or 0. Each time the output pulse 1 is derived at the terminal $b$, the 4-bit counter 461 starts to count the clock pulses from the pulse generator 456 and when it has counted four bits, it produces an output pulse and is reset by the output derived at the terminal $a$. Further, by the output 1 at the terminal $b$, 4-bit column infomation is read out and applied to the shift register 460 through the AND circuit 495. The respective bits in the register 460 are read out in parllel configuration by the output from the 4-bit counter 461 and their respective contents are applied to the flip-flop circuits FF1 to FF4 and the OR circuits 481 to 484, respectively. As a result of this, information of columns each having an informtion change is stored in each of the flip-flop circuits FF1 to FF4 and, at the same time, the contents read out from the register 460 are also stored in the registers 471 to 474, respectively. Next, when an output is derived at the terminal $a$ of the register 454, clock pulses are applied to the AND circuits 491 to 494 through the AND circuit 496 and the OR circuit 465, respectively, to obtain AND outputs from the clock pulses and the outputs from the flip-flop circuits FF1 to FF4 having stored the polarities of the bits whereby information of the same polarity as the original information is stored in the shift registers 471 to 474 through the OR circuits 481 to 484 respectively. When signals of four scanning lines have been stored in the shift registers 471 to 474 respectively, the contents of the shift registers are sequentially read out, starting with the register 471, and applied to the synthesizing circuit 459. The combiner 459 combines the signal from the circuit 498 with the signals from the registers 471 to 474 to produce a composite signal. The composite signal is stored in the storage circuit 462. By reading out the information stored in the circuit 462, the same fasimile signal as that applied to the input terminal 201 in FIG. 13 is derived from the output terminal 402.

In the foregoing description, 2-bit division codes and 1-bit division codes are employed as variable-length codes for coding of the number of idle lines and for coding of the number of columns of an information unchanged block, respectively. However, this is due to the statistical property of signals and if the number of signals of the same polarity whose durations are short is large and the number of signals of the same polarity whose durations are long is small, the 1-bit division codes are preferred and, in the opposite case, the 2-bit division codes are advantageous.

The foregoing has described, as a method of constructing an information unchanged block from a basic block, the method that the presence of an information change is examined while adding column information column by column. However, a general method is such that if the information of each column of the basic block composed of M lines and $u$ columns does not include any change with respect to the information of the column immediately preceding it, the information of blocks composed of M lines and B1 columns, M lines and B2 columns, and M lines and Bi columns (B1, B2, . . . . B$i$ being predetermined numbers of columns) following the basic block is applied until an information change occurs in the information of a subsequent block of M lines and Bi + 1 columns and that the block composed of M lines and ( $u$ + B1 + B2+ . . . B$i$) columns is used as an information unchanged block. In a case where B1, B2, . . . B$i$ = K (the case of K = 1 has already been described in detail), the information unchanged block is of such an area that K columns are added to the number of columns of the basic block but it is also possible that B1, B2, . . . B$i$ have different values.

What we claim is:

1. A system for coding two-dimensional information of M lines and N columns, comprising:

input terminal means for receiving said two-dimensional information;

first means connected to said input terminal means for developing M lines and U columns of said two-dimensional information as basic blocks wherein U N;

second means connected to said first means for detecting each basic block including at least one information change in any instant column information with respect to column information immediately preceding the instant column information;

third means connected to said first means and second means for coding information in the basic block detected by the second means;

fourth means connected to said first means for detecting when each column information has no information change with respect to the column information immediately preceding the instant column information;

fifth means connected to said first means and said fourth means for coding information corresponding to the number of columns of the basic block and the number of subsequent columns having no information change detected by the fourth means; and output means connected to said third means and said fifth means for combining outputs of said third means and fifth means and for transmitting the combined output.

2. A system according to claim 1, further including corrleation means connected before said input terminal means for performing the computing operation of a correlation function between an instant bit of information and an immediately preceding bit of information in at least either the line direction and the column direction of the twodimensional information.

3. A system according to claim 1, further including sixth means connected to said input terminal means for detecting idle lines each having no significant binary states of information, seventh means connected to said sixth means and said output means for coding the number of said idle lines to apply the coded output to said output means, and eighth means connected to said sixth means and said first means for causing the development of the basic blocks except said idle lines.

* * * * *